(12) United States Patent
Clark (10) Patent No.: US 8,298,056 B2
(45) Date of Patent: Oct. 30, 2012

(54) AIR RETURN BULKHEAD WITH REMOVABLE PANEL FOR ACCESS TO THE LOWER REGION OF A TRAILER REFRIGERATION UNIT

(75) Inventor: Toby Clark, Phenix City, AL (US)

(73) Assignee: Illinois Tool Works Inc., Glenview, IL (US)

( * ) Notice: Subject to any disclaimer, the term of this patent is extended or adjusted under 35 U.S.C. 154(b) by 1031 days.

(21) Appl. No.: 12/213,849

(22) Filed: Jun. 25, 2008

(65) Prior Publication Data

US 2009/0325476 A1  Dec. 31, 2009

(51) Int. Cl.
*B60H 1/32* (2006.01)
*B60H 1/00* (2006.01)
*F25D 17/04* (2006.01)

(52) U.S. Cl. .............................. 454/118; 62/407; 165/41
(58) Field of Classification Search .................... 454/91, 454/118–120
See application file for complete search history.

(56) References Cited

U.S. PATENT DOCUMENTS

| | | | |
|---|---|---|---|
| 3,399,916 A * | 9/1968 | Ensor | 52/588.1 |
| 4,399,737 A * | 8/1983 | Severson | 454/90 |
| 4,467,582 A * | 8/1984 | Hague | 52/478 |
| 4,796,393 A * | 1/1989 | Toti | 52/76 |
| 5,730,486 A * | 3/1998 | Jurica | 296/184.1 |
| 5,855,101 A * | 1/1999 | Schulte et al. | 52/506.05 |
| 5,927,785 A * | 7/1999 | Cantrell | 296/39.1 |
| 6,227,385 B1 * | 5/2001 | Nickerson | 211/59.3 |
| 6,296,561 B1 | 10/2001 | Ziegler et al. | |
| 6,364,388 B1 * | 4/2002 | Ziegler et al. | 296/24.35 |
| 6,945,865 B1 * | 9/2005 | Turek | 454/118 |
| 7,351,136 B2 | 4/2008 | Nelson et al. | |

* cited by examiner

*Primary Examiner* — Steven B McAllister
*Assistant Examiner* — Helena Kosanovic
(74) *Attorney, Agent, or Firm* — Law Offices of Steven W. Weinrieb (57) ABSTRACT

An air return bulkhead for use within refrigerated cargo trailers comprises a pair of substantially coplanar panel members disposed within a vertically oriented plane. A first lower main panel member is fixedly connected to the front wall member of the cargo trailer, and the second upper secondary panel member, in addition to also being connected to the front wall member of the cargo trailer, is also removably connected to the first lower main panel member so as to provide repair or maintenance personnel with easy access to the lower region of the refrigeration unit when, for example, repair or maintenance procedures need to be performed upon the refrigeration unit.

20 Claims, 5 Drawing Sheets

AIR RETURN BULKHEAD WITH REMOVABLE PANEL FOR ACCESS TO THE LOWER REGION OF A TRAILER REFRIGERATION UNIT

FIELD OF THE INVENTION

The present invention relates generally to air return bulkheads for use in connection with refrigeration units disposed within cargo trailers, and more particularly to a new and improved air return bulkhead which comprises a pair of substantially coplanar panel members disposed within a vertically oriented plane wherein a first lower main or primary one of the pair of substantially coplanar panel members is adapted to be fixedly connected to the front wall member of the cargo trailer, wherein the second upper secondary or auxiliary one of the pair of substantially coplanar panel members, in addition to also being adapted to be fixedly connected to the front wall member of the cargo trailer, is also adapted to be operatively connected to the first lower main or primary one of the pair of substantially coplanar panel members so as to be disposed atop the first lower main or primary one of the pair of substantially coplanar panel members, and wherein still further, the second upper secondary or auxiliary one of the pair of substantially coplanar panel members is readily, easily, and quickly removable from the first lower main or primary one of the pair of substantially coplanar panel members in order to provide repair or maintenance personnel with easy access to the lower region of the refrigeration unit when, for example, repair or maintenance procedures need to be performed upon the refrigeration unit. In this manner, the entire air return bulkhead does not need to be removed from its fixed position upon the front wall member of the cargo trailer, but only the second upper secondary or auxiliary panel member of the air return bulkhead needs to be removed.

BACKGROUND OF THE INVENTION

Temperature-controlled cargo containers, such as, for example, refrigerated trucking trailers, are of course well known for transporting food or other products that need to be shipped under predetermined temperature-controlled conditions. Conventionally, a refrigerated trailer usually has a refrigeration unit mounted upon an upper region of the front wall member of the trailer wherein a major portion of the refrigeration unit usually projects outwardly through the front wall member of the trailer so as to effectively be located externally of the trailer, however, relatively warm air inlet and relatively cooled air outlet portions of the refrigeration unit are fluidically connected to the interior cargo space of the refrigeration trailer so as to continuously recirculate cooled or refrigerated air throughout the interior cargo space of the refrigeration trailer. More particularly, the relatively warm air is effectively sucked into the air inlet portion of the refrigeration unit from regions of the refrigeration trailer which are disposed within the vicinity of the floor of the trailer, while cooled or refrigerated air is effectively forced outwardly from the air outlet portion of the refrigeration unit and into those regions of the refrigerated trailer which are disposed within the vicinity of the ceiling of the refrigeration trailer. In addition, in order to facilitate or cause the cooled or refrigerated air to in fact traverse substantially the entire axial extent of the interior cargo space within the refrigerated trailer such that a substantially uniform temperature level is in fact achieved throughout the entire axial length or extent of the interior cargo space of the refrigerated trailer, axially extending ducting is provided within the vicinity of the interior ceiling surface portion of the refrigerated trailer, and suitable vents are provided at predeterminedly spaced axial locations within such ducting in order to permit the cooled refrigerated air to flow outwardly from the ducting at such predetermined axial locations along the axial extent of the refrigeration trailer.

In addition, a vertically oriented air return bulkhead is operatively connected to the front wall member of the refrigeration trailer so as to substantially extend vertically between the air inlet portion of the refrigeration unit and the floor region of the refrigeration trailer. The air return bulkhead effectively defines a hollow enclosure whereby, for example, peripheral portions of the air return bulkhead can be attached to the front wall member of the refrigerated trailer, however, the central portion of the air return bulkhead is effectively spaced from the front wall member of the refrigeration trailer so as to effectively define a relatively warm return air conduit from the floor region of the refrigeration trailer to the air inlet portion of the refrigeration unit. An example of such a conventional mounting of a refrigeration unit upon a front wall member of a refrigerated trailer, the use of such axially extending ducting within the internal ceiling region of the refrigerated trailer in order to conduct relatively cooled air toward the rear portion of the refrigerated trailer, and the use of the an air return bulkhead mounted upon the front wall member of the refrigerated trailer so as to effectively define a relatively warm air return conduit for conducting relatively warm air from the floor region of the refrigeration trailer to the air inlet portion of the refrigeration unit, is disclosed, for example, within FIG. 1 of U.S. Pat. No. 7,351,136 which issued to Nelson et al. on Apr. 1, 2008, such disclosure being incorporated herein by reference.

While the air return bulkhead as disclosed within the aforenoted patent to Nelson et al. is operatively satisfactory, it is noted that periodically the refrigeration unit may require repair or maintenance. For example, as a result of the continuous refrigeration cycling of the refrigeration unit, wherein relatively warmed air is being continuously returned from the interior cargo space of the refrigerated trailer back toward the air inlet portion of the refrigeration unit such that the refrigeration unit can cool the relatively warmed air and effectively discharge relatively cooled or refrigerated air back out into the interior cargo space of the refrigerated trailer within the vicinity of the ceiling member of the refrigerated trailer, the filter member, normally disposed or operatively associated with the air inlet portion of the refrigeration unit, may need to be periodically cleaned of debris, dust particles, or the like. Accordingly, the air return bulkhead must be entirely removed from its mounted position upon the front wall member of the refrigerated trailer in order to permit repair or maintenance to effectively gain access to the air inlet portion of the refrigeration unit or to other operational components of the refrigeration unit. It can therefore be readily appreciated that the removal or disassembly of the entire air return bulkhead from its mounted position upon the front wall member of the refrigerated trailer is therefore oftentimes quite time-consuming and tedious in view of the relatively large number of fasteners, mounting brackets, or the like, normally utilized or employed to fixedly secure the entire return air bulkhead to or upon the front wall member of the refrigeration trailer.

A need therefore exists in the art for a new and improved air return bulkhead wherein, for example, only a portion of the return air bulkhead needs to be readily, easily, and quickly removed so as not to comprise a tedious process normally or conventionally involving the removal of the entire air return bulkhead from its mounted position upon the front wall member of the refrigerated trailer, and wherein the removal of only a portion of the return air bulkhead will in fact be sufficient so as to permit repair or maintenance personnel to gain access to the lower region of the refrigeration unit without requiring an inordinate amount of time. In addition, a need exists in the art for a new and improved air return bulkhead wherein the removable portion of the air return bulkhead can not only be readily, easily, and quickly engaged with, and disengaged from, the residual main portion of the return air bulkhead which is fixed to or mounted upon the front wall member of the refrigeration trailer, but in addition, the removable portion of the air return bulkhead can likewise also be readily, easily, and quickly fixed to or mounted upon the front wall member of the refrigeration trailer.

SUMMARY OF THE INVENTION

The foregoing and other objectives are achieved in accordance with the teachings and principles of the present invention through the provision of a new and improved air return bulkhead which effectively comprises or defines a hollow enclosure whereby, for example, peripheral portions of the air return bulkhead can be attached to the front wall member of the refrigerated trailer, however, the central portion of the air return bulkhead is effectively spaced from the front wall member of the refrigerated cargo trailer, and disposed within a plane substantially parallel to the front wall member of the refrigerated cargo trailer, so as to effectively define a vertically oriented relatively warm return air conduit which extends from the floor region of the refrigeration trailer to the air inlet portion of the refrigeration unit. More particularly, the new and improved air return bulkhead comprises a first lower main or primary panel member which is adapted to be fixedly secured to the front wall member of the refrigeration trailer, and a second upper secondary or auxiliary panel member which is adapted to be removably engaged with and mounted upon the first lower main or primary panel member as a result of the lower edge portion of the second upper secondary or auxiliary panel member being removably interengaged with an upper edge portion of the first lower main or primary panel member.

The first lower main or primary panel member and the second upper secondary or auxiliary panel member are disposed in a substantially coplanar manner with respect to each other, and suitable fastener means may be provided so as to also affix peripheral portions of the second upper secondary or auxiliary panel member to the front wall member of the refrigeration trailer when the second upper secondary or auxiliary panel member is in fact fixedly disposed atop the first lower main or primary panel member. In this manner, when the second upper secondary or auxiliary panel member is fixedly disposed atop the first lower main or primary panel member, the first lower primary and the second upper auxiliary panel members together define the air return conduit for conducting the relatively warm air from the interior cargo area of the refrigerated trailer to the air inlet portion of the refrigeration unit, whereas, when repair or maintenance personnel need to gain access to the lower region of the refrigeration unit such that suitable or necessary repairs or maintenance procedures can in fact be performed upon the refrigeration unit, only the second upper secondary or auxiliary panel member needs to be disengaged or removed from its position disposed atop the first lower main or primary panel member, and can in fact be readily, easily, and quickly removed from the first lower main or primary panel member as well as from, or with respect to, the front wall member of the refrigerated cargo trailer.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 3 is an enlarged partially sectioned view of the new and improved air return bulkhead, as illustrated in FIG. 2, although the air return bulkhead has been inverted from its orientation disclosed within FIG. 2, wherein it can be clearly seen that the first lowermost set of grid or screen type apertures, disposed closest to the floor region of the refrigerated trailer, are defined within a wall member which is disposed substantially perpendicular to the front surface portion of the air return bulkhead, whereas the second uppermost set of grid or screen-type apertures are defined within a wall member which is disposed at a predetermined angle, such as, for example, 45°, with respect to either the front or rear surface portions of the air return bulkhead so as to permit additional relatively warm return air, disposed at an elevational level substantially above the floor region of the refrigerated trailer, to nevertheless be capable of entering the return air conduit;

DETAILED DESCRIPTION OF THE PREFERRED EMBODIMENT

Figure 1:
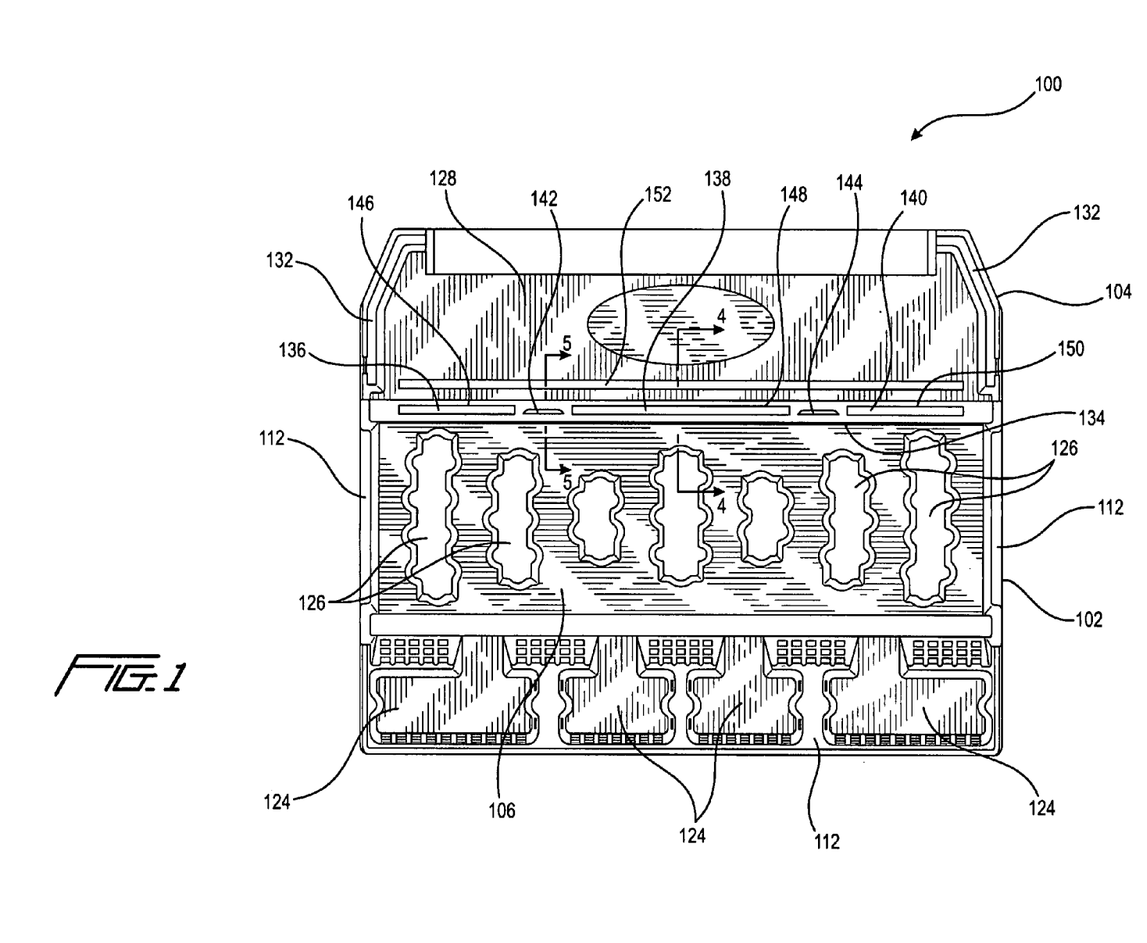
FIG. 1 is a rear elevational view of a first embodiment of a new and improved air return bulkhead as constructed in accordance with the principles and teachings of the present invention and showing the cooperative parts thereof as comprising the first lower main or primary panel member and the second upper secondary or auxiliary panel member mounted atop the first lower main or primary panel member in a substantially coplanar manner, wherein the surface viewed within the drawing figure is considered to be the rear surface portion of the air return bulkhead in view of the fact that such surface portion is disposed toward the interior of the refrigerated cargo trailer and is therefore adapted to face the rear wall member of the refrigerated cargo trailer.
Figure 2:
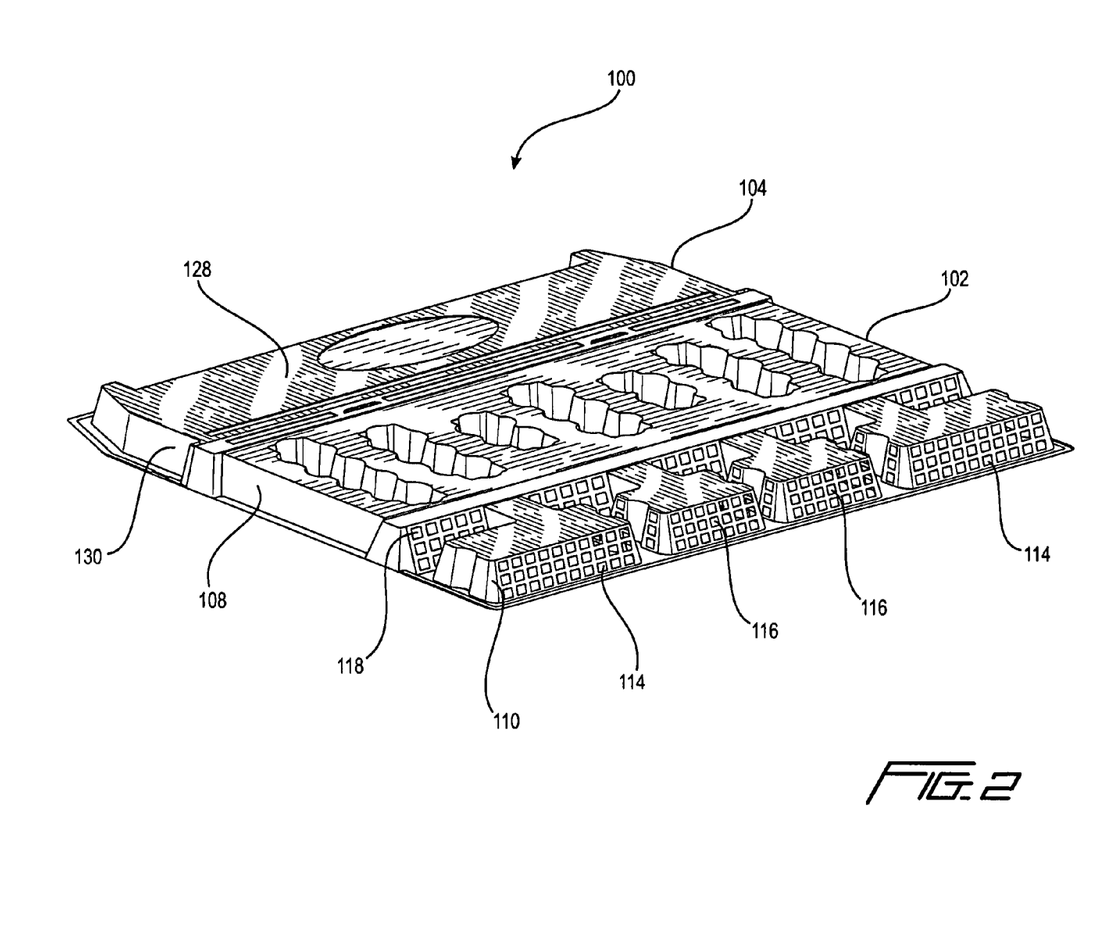
FIG. 2 is a perspective view of the new and improved air return bulkhead, as illustrated within FIG. 1, showing, more clearly, the two sets of transversely oriented, vertically spaced apertures, formed within screen or grid-type arrangements within lower regions of the first lower main or primary panel member, so as to fluidically conduct relatively warm return air into the return air conduit effectively defined between the central portion of the air return bulkhead and the front wall member of the refrigerated trailer.
Figure 3:
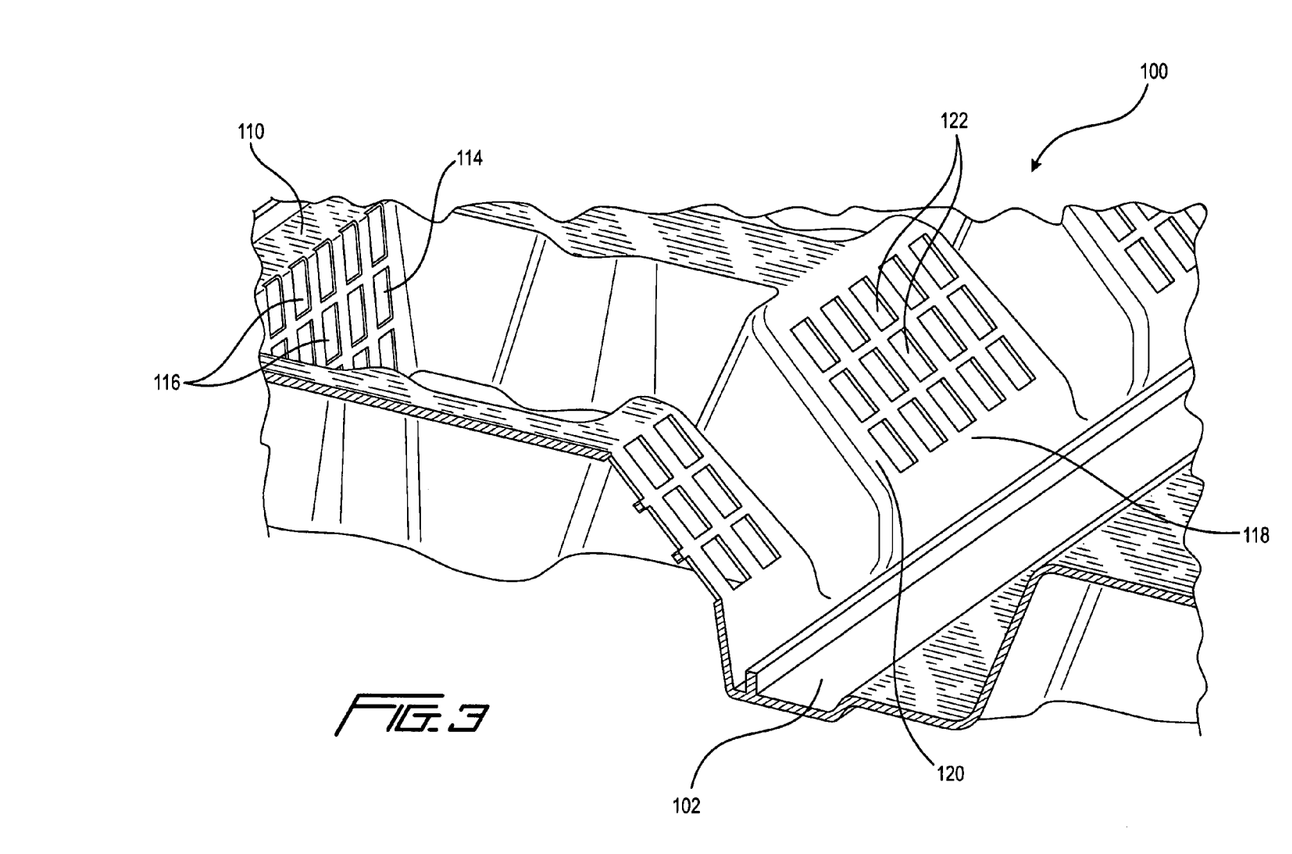

Referring now to the drawings, and more particularly to FIGS. 1-3 thereof, a first embodiment of a new and improved air return bulkhead, as constructed in accordance with the principles and teachings of the present invention and showing the cooperative parts thereof, is disclosed and is generally indicated by the reference character 100. The air return bulkhead 100 may be fabricated from any suitable thermoplastic materials, such as, for example, polyvinylchloride (PVC), and may be formed by any suitable molding techniques, such as, for example, vacuum molding, thermomolding, or the like. In accordance with the unique principles and teachings of the present invention, it is seen that the first embodiment of the new and improved return air bulkhead 100 comprises a first lower main or primary panel member 102 and a second upper secondary or auxiliary panel member 104, wherein the second upper secondary or auxiliary panel member 104 is adapted to be removably mounted atop or upon the first lower main or primary panel member 102 as will be explained more fully hereinafter, and that the entire air return bulkhead 100 effectively comprises a hollow enclosure structure as can best be appreciated from FIG. 2. More particularly, it is seen, for example, that the first lower main or primary panel member 102 comprises a substantially solid wall member having a rear surface portion 106 defined thereon in that the rear surface portion 106 is disposed toward, or faces, the interior cargo space of the refrigerated cargo trailer and is likewise disposed toward, or faces, the rear wall member of the refrigerated cargo trailer. The first lower main or primary panel member 102 further comprises a pair of oppositely disposed side wall members which are disposed substantially perpendicular to the rear surface portion 106, only one of which is truly visible at 108 within FIG. 2, and a bottom wall member 110 which is likewise disposed substantially perpendicular to the rear surface portion 106.

As can best be seen from FIG. 1, the first lower main or primary panel member 102 is also provided with a plurality of peripheral flange portions 112, extending along the oppositely disposed side wall members 108 and the bottom wall member 110, within which suitable fasteners, not shown, may be disposed so as to fixedly secure or mount the first lower main or primary panel member 102 to or upon the front wall member of the refrigerated cargo trailer. It can therefore be readily appreciated that when the first lower main or primary panel member 102 is in fact fixedly secured to or mounted upon the front wall member of the refrigerated cargo trailer, the interior surface portion of the first lower main or primary panel member 102, that is, the surface portion of the first lower main or primary panel member 102 that faces the front wall member of the refrigerated trailer, will be disposed within a vertical plane which is substantially parallel to, and spaced from, the front wall member of the refrigerated cargo trailer such that the first lower main or primary panel member 102 will effectively partially define a relatively warm air return conduit leading up to the air inlet portion of the refrigeration unit, as will become more fully apparent hereinafter, in a manner similar to that illustrated within the aforenoted U.S. Pat. No. 7,351,136 to Nelson et al. Since the peripheral portions 112 of the first lower main or primary panel member 102 will be fixedly secured to or mounted upon the front wall member of the refrigerated cargo trailer in a substantially sealed manner as is well known in the industry, it is further seen that the bottom wall member 110 of the first lower main or primary panel member 102 is provided with a first set of transversely or laterally spaced apertures 114, as can best be seen in FIGS. 2 and 3, so as to permit the relatively warm return air, disposed within the immediate vicinity of the floor member of the refrigerated cargo trailer, to flow into the relatively warm air return conduit, defined between the first lower main or primary panel member 102 and the front wall member of the refrigerated trailer.

More particularly, it is seen that each one of the apertures 114 actually comprises a multiplicity of apertures 116 which are arranged within a screen or grid-type pattern. In a similar manner, in order to effectively capture and entrain those portions of the relatively warm air disposed within the vicinity of the floor member of the refrigerated cargo trailer, but located at an elevational level somewhat removed from the floor member of the refrigerated cargo trailer, a second set of transversely or laterally spaced apertures 118, as can also best be seen in FIGS. 2 and 3, are defined within an auxiliary wall member 120 which is disposed at a predetermined angle, such as, for example, 45°, with respect to the rear surface portion 106 or bottom wall member 110 of the first lower primary or main panel member 102. As was the case with the transversely or laterally spaced sets of apertures 114, each one of the laterally or transversely spaced apertures 118 likewise comprises a multiplicity of apertures 122 which are arranged within a screen or grid-type pattern.

It is also seen that the lower region of the first lower main or primary panel member 102 is further provided with a plurality of transversely or laterally spaced convexly bulged reinforcement members 124, the bottom or lower portions of which collectively define the bottom wall member 110 of the first lower main or primary panel member 102 and within which the first set of laterally or transversely spaced apertures 114 are defined, and in addition, the upper region of the first lower main or primary panel member 102 is provided with a plurality of vertically oriented concavities 126 which likewise effectively provide the first lower main or primary panel member 102 with additional reinforcement properties. It is also to be appreciated that the aforenoted angled or sloped wall member 120, having the aforenoted sets of laterally or transversely spaced apertures 118 defined therein, is effectively interposed between the aforenoted upper and lower regions of the first lower main or primary panel member 102.

It is lastly noted that in view of the fact that the lowermost regions of the first lower main or primary panel member 102 are most likely to encounter the most contact with the cargo to be disposed within the refrigeration trailer, such lowermost regions of the first lower main or primary panel member 102, such as, for example, within the vicinity of the reinforcement members 124, may have a greater thickness dimension than, for example, other portions or regions of the first lower main or primary panel member 102.

As can best be seen from FIGS. 1 and 2, the second upper secondary or auxiliary panel member 104, in a manner similar to that of the first lower main or primary panel member 102, is seen to comprise a solid wall member which has a rear surface portion 128 defined thereon which, again, in a manner similar to that of the first lower main or primary panel member 102, is disposed toward, or faces, the interior cargo space of the refrigerated cargo trailer and is likewise disposed toward, or faces, the rear wall member of the refrigerated cargo trailer. The second upper secondary or auxiliary panel member 104 further comprises a pair of oppositely disposed side wall members which are disposed substantially perpendicular to the rear surface portion 128, only one of which is truly visible at 130 within FIG. 2, and a plurality of peripheral flange portions 132 extend along the oppositely disposed side wall members 130 within which suitable fasteners, not shown, may be disposed or engaged so as to fixedly secure or mount the second upper secondary or auxiliary panel member 104 to or upon the front wall member of the refrigerated cargo trailer. It has been previously disclosed that the second upper secondary or auxiliary panel member 104 is adapted to be detachably or removably mounted upon or atop the first lower main or primary panel member 102, and it is therefore to be appreciated that when the second upper secondary or auxiliary panel member 104 is in fact mounted upon or atop the first lower main or primary panel member 102, and also fixedly secured to or mounted upon the front wall member of the refrigerated cargo trailer, the second upper secondary or auxiliary panel member 104 will effectively be disposed in a coplanar manner with respect to the first lower main or primary panel member 102. Accordingly, the opposite interior surface portion of the second upper secondary or auxiliary panel member 104, in a manner similar to the disposition of the interior surface portion of the first lower main or primary panel member 102, will be disposed within a vertical plane which is disposed substantially parallel to, and spaced from, the front wall member of the refrigerated cargo trailer such that the second upper secondary or auxiliary panel member 104, together with the first lower main or primary panel member 102, will effectively complete the definition of the relatively warm air return conduit leading up to the air inlet portion of the refrigeration unit.

With reference therefore now being made to FIGS. 1, 4 and 5, the manner in which the second upper secondary or auxiliary panel member 104 is detachably or removably mounted upon or atop the first lower main or primary panel member 102 will now be described. More particularly, as can best be appreciated from FIGS. 1 and 4, the upper edge region of the first lower main or primary panel member 102 is provided with a first lowermost convexly configured rib member 134 which extends transversely across substantially the entire width dimension of the first lower main or primary panel member 102 and which effectively projects outwardly from the rear surface portion 106 of the first lower main or primary panel member 102 so as to extend toward the rear wall member of the refrigerated trailer. In addition, the upper edge region of the first lower main or primary panel member 102 is also provided with a series of three transversely or laterally spaced concavely configured rib members 136, 138, 140 which effectively project inwardly from the rear surface portion 106 of the first lower main or primary panel member 102 so as to extend toward the front wall member of the refrigerated trailer and wherein lower edge portions of the three transversely or laterally spaced concavely configured rib members 136, 138, 140 are integrally connected to upper edge portions of the first lowermost convexly configured rib member 134.

Still further, each pair of adjacent ones of the concavely configured rib members 136, 138, 140 defined within the upper edge region of the first lower main or primary panel member 102, that is, rib members 136, 138 and rib members 138, 140, are respectively separated from each other by means of one of a pair of vertically upwardly extending, inwardly projecting tab members 142, 144, for a purpose which will be described shortly hereinafter, tab member 142 being clearly illustrated within FIG. 5. Lastly, the upper edge region of the first lower main or primary panel member 102 is also provided with a series of three uppermost, transversely or laterally spaced, convexly configured, upwardly extending flanged portions or members 146, 148, 150 that effectively correspond in their lateral or transverse extents to those of the concavely configured rib members 136, 138, 140, and wherein lower edge portions of the three uppermost, transversely or laterally spaced, convexly configured, upwardly extending flanged portions or members 146, 148, 150 are respectively integrally connected to upper edge portions of the three concavely configured rib members 136, 138, 140.

In a corresponding manner, it is seen that the lower edge region of the second upper secondary or auxiliary panel member 104 is provided with a first uppermost concavely configured rib member 152 which extends transversely across substantially the entire width dimension of the second upper secondary or auxiliary panel member 104 and which effectively projects inwardly from the rear surface portion 128 of the second upper secondary or auxiliary panel member 104 so as to extend toward the front wall member of the refrigerated trailer. In addition, within those areas of the lower edge region of the second upper secondary or auxiliary panel member 104 that transversely correspond to the positions at which the series of the three transversely or laterally spaced concavely configured rib members 136, 138, 140, and the series of the three uppermost, laterally or transversely spaced, convexly configured, upwardly extending flanged portions or members 146, 148, 150, of the first lower main or primary panel member 102 are located, the lower edge region of the second upper secondary or auxiliary panel member 104 is further provided with a series of three transversely or laterally spaced convexly configured rib members, only one of which is visible within FIG. 4 at 154, such that the three transversely or laterally spaced convexly configured rib members, as exemplified by means of rib member 154, project outwardly from the rear surface portion 106 of the first lower main or primary panel member 102 so as to extend toward the rear wall member of the refrigerated trailer. Upper edge portions of the three transversely or laterally spaced convexly configured rib members, as exemplified by means of rib member 154, are respectively integrally connected to lower edge portions of the first uppermost concavely configured rib member 152, and it is seen that the three transversely or laterally spaced convexly configured rib members, as exemplified by means of rib member 154, are adapted to be respectively engaged and mated with, and seated upon or within the three uppermost, transversely or laterally spaced, convexly configured, upwardly extending flanged portions or members 146, 148, 150 of the first lower main or primary panel member 102 as exemplified by means of the convexly configured, upwardly extending flanged portion or member 148 of the first lower main or primary panel member 102.

Figures 4, 5, 6, 7:
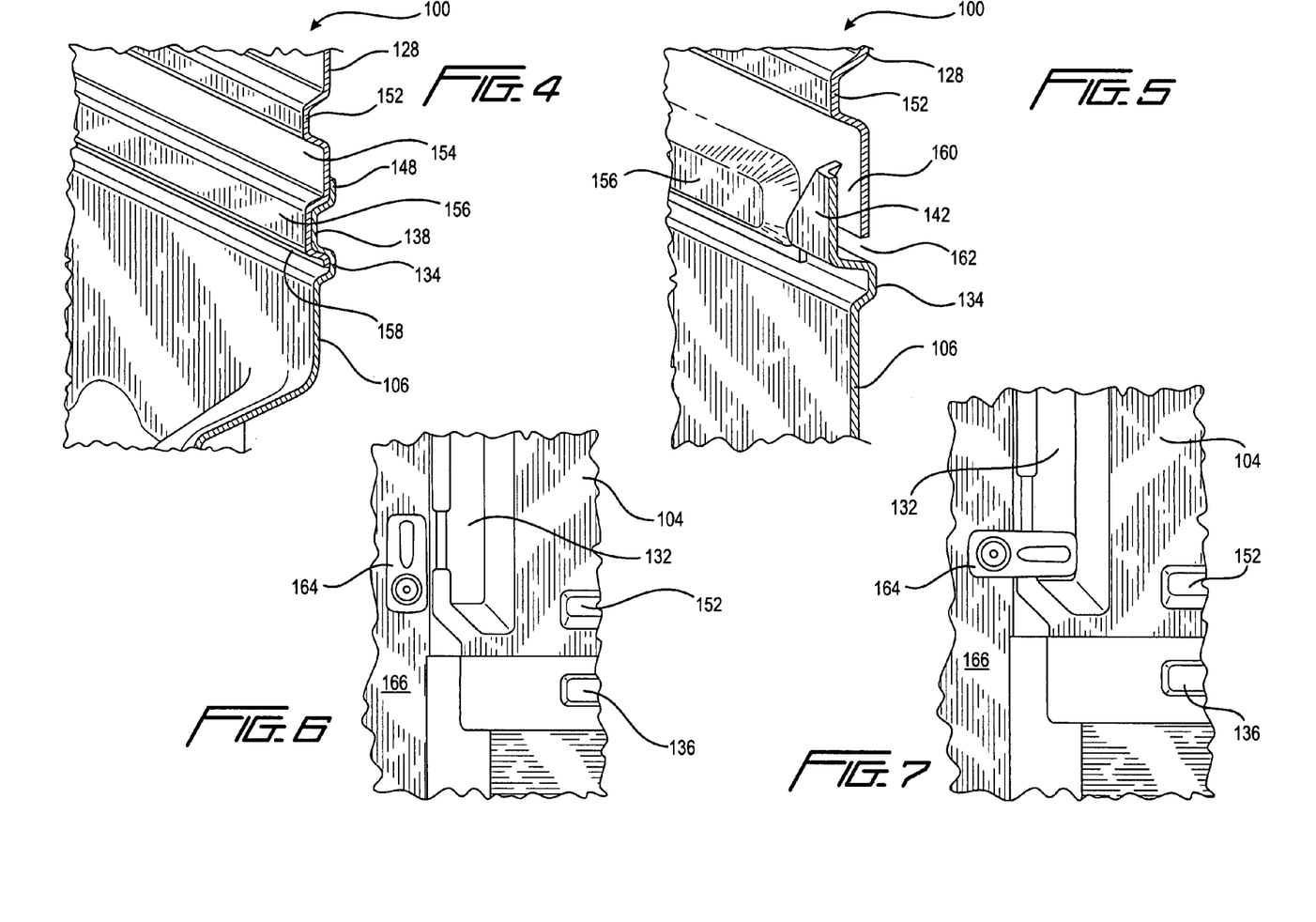
FIG. 4 is an enlarged cross-sectional view of the new and improved air return bulkhead as illustrated within FIG. 1, and as taken along lines 4-4 of FIG. 1, showing the transversely extending rib and flange members respectively formed within the upper edge portion of the first lower main or primary panel member and within the lower edge portion of the second upper secondary or auxiliary panel member such that the lower edge portion of the second upper secondary or auxiliary panel member can be engaged with and mounted upon the upper edge portion of the first lower main or primary panel member in an interengaged or interdigitated manner.
FIG. 5 is an enlarged cross-sectional view of the new and improved air return bulkhead as illustrated within FIG. 1, and similar to the enlarged cross-sectional view as illustrated within FIG. 4 except that the cross-sectional cut line is taken along lines 5-5 of FIG. 1 so as to illustrate the tab members of the first lower main or primary panel member which effectively project through notches or apertures formed within the second upper secondary or auxiliary panel member in order to effectively engage a front or forward facing surface portion of the second upper secondary or auxiliary panel member so as to effectively lockingly engage the first lower main or primary panel member and the second upper secondary or auxiliary panel member together.
FIGS. 6 and 7 are partial views of the air return bulkhead illustrated within FIG. 1 wherein a clamp fastener is pivotally mounted upon the front wall member of the refrigerated trailer so as to be movable from a disengaged position with respect to a peripheral edge portion of the second upper secondary or auxiliary panel member of the air return bulkhead, as illustrated within FIG. 6, to an engaged position with respect to the peripheral edge portion of the second upper secondary or auxiliary panel member of the air return bulkhead, as illustrated within FIG. 7, such that the second upper secondary or auxiliary panel member of the air return bulkhead can effectively be secured to the front wall member of the refrigerated trailer.

Continuing further, it is also seen that within those areas of the lower edge region of the second upper secondary or auxiliary panel member 104 that transversely correspond to the locations of the series of the three transversely or laterally spaced concavely configured rib members 136, 138, 140 of the first lower main or primary panel member 102, the lower edge region of the second upper secondary or auxiliary panel member 104 is further provided with a series of three transversely or laterally spaced concavely configured rib members, only one of which is visible within FIG. 4 at 156, such that the three transversely or laterally spaced concavely configured rib members, as exemplified by means of rib member 156, project inwardly from the rear wall member 128 of the second upper secondary or auxiliary panel member 104 so as to extend toward the front wall member of the refrigerated trailer. Upper edge portions of the three transversely or laterally spaced concavely configured rib members, as exemplified by means of rib member 156, are respectively integrally connected to lower edge portions of the three transversely or laterally spaced convexly configured rib members, as exemplified by means of rib member 154, and it is also seen that the three transversely or laterally spaced concavely configured rib members, as exemplified by means of rib member 156, are adapted to be respectively engaged and mated with the three transversely or laterally spaced concavely configured rib members 136, 138, 140 of the first lower main or primary panel member 102, as exemplified by means of the concavely configured rib member 138.

Lastly, the lowermost edge region of the second upper secondary or auxiliary panel member 104 is also provided with a series of three transversely or laterally spaced, convexly configured, downwardly extending flanged portions or members, only one of which is visible at 158 within FIG. 4, that effectively correspond in their lateral or transverse extents to those of the concavely configured rib members 136, 138, 140, and wherein upper edge portions of the three laterally or transversely spaced, convexly configured, downwardly extending flanged portions or members, as exemplified by means of flanged member 158, are respectively integrally connected to lower edge portions of the three concavely configured rib members as exemplified by means of the rib member 156. It can therefore be appreciated that the upper edge region of the first lower main or primary panel member 102, and the lower edge region of the second upper secondary or auxiliary panel member 104 have substantially S-shaped or sinusoidal-shaped cross-sectional configurations wherein the various convex and concave portions thereof effectively interengage each other in an interdigitated manner such that the first lower main or primary panel member 102 and the second upper secondary or auxiliary panel member 104 are effectively mated together.

In order to in fact maintain the first lower main or primary panel member 102 and the second upper secondary or auxiliary panel member 104 mated together as illustrated within FIG. 4, it will be recalled from FIG. 5 that the upper edge region of the first lower main or primary panel member 102 is provided with the series of three transversely or laterally spaced concavely configured rib members 136, 138, 140 and that adjacent pairs of the three transversely or laterally spaced concavely configured rib members 136, 138, 140, that is, rib members 136, 138 and rib members 138, 140, are respectively separated from each other by means of one of a pair of vertically upwardly extending, inwardly projecting tab members 142, 144, with the tab member 142 being illustrated within FIG. 5. Concomitantly, it can also be appreciated from FIG. 5 that within the vicinity of the tab members 142, 144, as exemplified by means of tab member 142 within FIG. 5, the series of three transversely or laterally spaced concavely configured rib members, as exemplified by means of rib member 156, of the rear wall member 128 of the second upper secondary or auxiliary panel member 104, are effectively foreshortened or terminated so as to effectively define spaces, as exemplified by means of space 160 illustrated within FIG. 5, between adjacent ones of the series of three transversely or laterally spaced concavely configured rib members, as exemplified by means of rib member 156.

In addition, in lieu of the concavely configured rib member 138 and the convexly configured flanged member 148 of the first lower main or primary panel member 102 being integrally connected to the convexly configured rib member 134 of the first lower main or primary panel member 102, the concavely configured rib member 138 and the convexly configured flanged member 148 have effectively been eliminated, and lower edge portions of the upwardly projecting tab members 142, 144 are respectively integrally connected to upper edge portions of the convexly configured rib member 134, as exemplified by means of the integral connection of the tab member 142 to the rib member 134 as illustrated within FIG. 5, whereby the tab members 142, 144, as exemplified by means of the tab member 142 illustrated within FIG. 5, will respectively project upwardly within the spaces defined within the lower edge region of the second upper secondary or auxiliary panel member 104 as exemplified by means of the space 160. Lastly, it is also seen that convexly configured rib member 154, the concavely configured rib member 156, and the convexly configured flanged member 158 of the second upper secondary or auxiliary panel member 104 have also been effectively eliminated from such lower edge regions of the second upper secondary or auxiliary panel member 104, and in lieu thereof, these regions of the second upper secondary or auxiliary panel member 104 have been provided with slits, openings, notches, or the like, as exemplified by means of slit, opening, notch, or the like, 162 as illustrated within FIG. 5, so as to effectively permit the upstanding tab members 142, 144 of the first lower main or primary panel member 102 to be inserted therethrough as exemplified by means of the tab member 142 illustrated within FIG. 5. In this manner, the upstanding tab members 142, 144 will effectively engage front surface portions 162 of the second upper secondary or auxiliary panel member 104 while, for example, the rib and flanged members 134, 136, 138, 140, 146, 148, 150 engage rear surface portions of the rib and flanged members 154, 156, 158 of the second upper secondary or auxiliary panel member 104 thereby effectively preventing separation of the lower edge portion of the second upper secondary or auxiliary panel member 104 from the upper edge portion of the first lower main or primary panel member 102 except when in fact the second upper secondary or auxiliary panel member 104 is to be detached or removed from the first lower main or primary panel member 102 for the aforenoted repair or maintenance procedures to be performed upon the refrigeration unit.

With reference now being made to FIGS. 6 and 7, there is illustrated an exemplary embodiment of fastener means which may be employed in connection with the second upper secondary or auxiliary panel member 104 so as to fixedly secure the second upper secondary or auxiliary panel member 104 to the front wall member of the refrigerated trailer, and yet permit the removal of the second upper secondary or auxiliary panel member 104 from the front wall member of the refrigerated trailer when, for example, the second upper secondary or auxiliary panel member 104 is to be removed from the first lower main or primary panel member 102 in order to provide repair or maintenance personnel access to, for example, the air inlet portion of the refrigeration unit. More particularly, it is seen that a clamp fastener 164 is pivotally mounted upon the front wall member 166 of the refrigerated trailer so as to be movable from a disengaged position with respect to the second upper secondary or auxiliary panel member 104 of the air return bulkhead, as illustrated within FIG. 6, to an engaged position with respect to the peripheral flanged portions 132 of the second upper secondary or auxiliary panel member 104 of the air return bulkhead, as illustrated within FIG. 7, such that the second upper secondary or auxiliary panel member 104 of the air return bulkhead can effectively be secured to the front wall member 166 of the refrigerated trailer.

Figure 8:
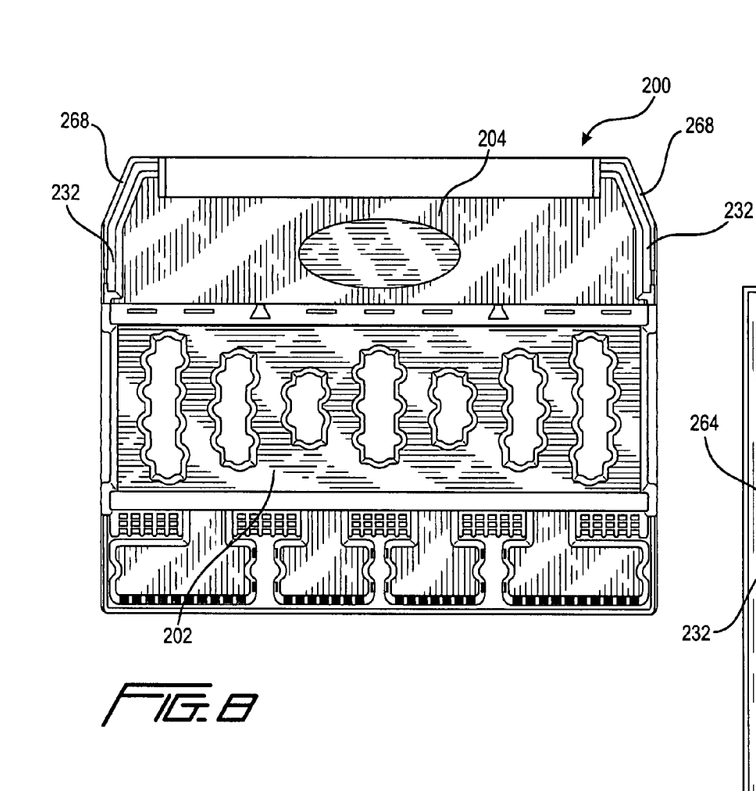
FIG. 8 is a rear elevational view, similar to that of FIG. 1, showing, however, a second modified embodiment of a new and improved air return bulkhead as constructed in accordance with the principles and teachings of the present invention.
Figure 9:
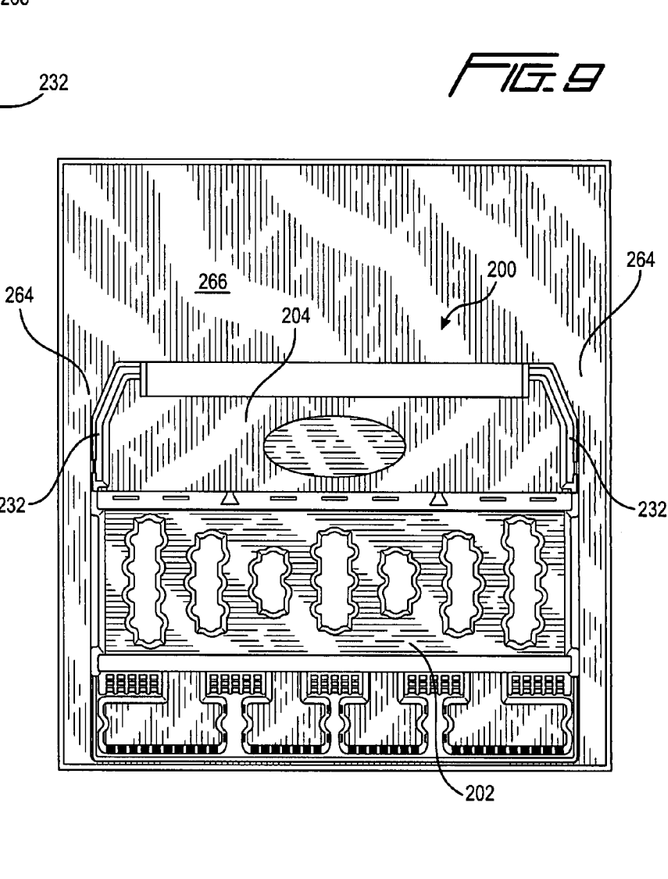
FIG. 9 is a rear elevational view, similar to that of FIG. 8, showing the second modified embodiment of the new and improved air return bulkhead as disposed within a refrigerated cargo trailer and as mounted upon the front wall member of the refrigerated cargo trailer so as to effectively define the relatively warm air return conduit leading up to the air inlet portion of the refrigeration unit.

With reference lastly being made to FIGS. 8 and 9, a second modified embodiment of a new and improved air return bulkhead, as constructed in accordance with the principles and teachings of the present invention, is disclosed and is generally indicated by the reference character 200. In view of the fact that the second embodiment of the new and improved air return bulkhead 200 is substantially the same as the first embodiment air return bulkhead 100, a detailed description of the same will be omitted herefrom for brevity purposes, the discussion of the same concentrating, instead, upon the differences between the first and second embodiment air return bulkheads 100, 200. In addition, it is noted that component parts of the second embodiment air return bulkhead 200, which correspond to component parts of the first air return bulkhead 100, will be designated by corresponding reference characters except that they will be within the 200 series. Accordingly, it is to be noted that the only significant difference between the first and second embodiment air return bulkheads 100, 200 resides in the location at which the clamp fasteners 264 engage the peripheral flanged portions 232 of the second upper secondary or auxiliary panel member 204 in order to fixedly secure the second upper secondary or auxiliary panel member 204 to the front wall member 266 of the refrigerated trailer. More particularly, in lieu of the clamp fasteners 264 engaging the peripheral flanged portions 232 of the second upper secondary or auxiliary panel member 204 within the lower region thereof adjacent to the interengaged interface defined between the first lower main or primary panel member 202 and the second upper secondary or auxiliary panel member 204, upper regions of the second upper secondary or auxiliary panel member 204 are provided with notches or the like 268, as seen in FIG. 8, within the vicinity of the upper edge portion of the second upper secondary or auxiliary panel member 204, and the clamp fasteners 264 are effectively permitted to pivot within such notches or the like 268 so as to engage the flanged portions 232 of the second upper secondary or auxiliary panel member 204 within such upper regions thereof.

Thus, it may be seen that in accordance with the principles and teachings of the present invention, there has been provided a new and improved air return bulkhead for use within refrigerated cargo trailers wherein the new and improved air return bulkhead comprises a pair of substantially coplanar panel members disposed within a vertically oriented plane wherein a first lower main or primary one of the pair of substantially coplanar panel members is adapted to be fixedly connected to the front wall member of the cargo trailer, wherein the second upper secondary or auxiliary one of the pair of substantially coplanar panel members, in addition to also being adapted to be fixedly connected to the front wall member of the cargo trailer, is also adapted to be operatively connected to the first lower main or primary one of the pair of substantially coplanar panel members so as to be disposed atop the first lower main or primary one of the pair of substantially coplanar panel members, and wherein still further, the second upper secondary or auxiliary one of the pair of substantially coplanar panel members is readily, easily, and quickly removable from the first lower main or primary one of the pair of substantially coplanar panel members in order to provide repair or maintenance personnel with easy access to the lower region of the refrigeration unit when, for example, repair or maintenance procedures need to be performed upon the refrigeration unit. In this manner, the entire air return bulkhead does not need to be removed from its fixed position upon the front wall member of the cargo trailer, but only the second upper secondary or auxiliary panel member of the air return bulkhead needs to be removed.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An air return bulkhead to be used within a refrigeration container for conducting return air from the cargo area of the refrigeration container to an air inlet portion of a refrigeration unit disposed within the refrigeration container, comprising:

a first lower panel member adapted to be fixedly mounted to a wall member of the refrigeration container such that a first surface portion of said first lower panel member is spaced from the wall member of the refrigeration container in order to partially define a return air conduit, between said first surface portion of said first lower panel and the wall member of the refrigeration container, for conducting return air toward the air inlet portion of the refrigeration unit disposed within the refrigeration container;

a second upper panel member removably disposed atop said first lower panel member such that a second surface portion of said second upper panel member is disposed in a substantially coplanar manner with respect to said first surface portion of said first lower panel member so as to effectively complete the definition of said return air conduit leading up to the air inlet portion of the refrigeration unit disposed within the refrigeration container;

said first lower panel member comprising a plurality of transversely oriented first rib members extending across said first lower panel member wherein said plurality of first rib members are vertically spaced with respect to each other so as to define a plurality of first spaces therebetween; and said second upper panel member comprising a plurality of transversely oriented second rib members extending across said second upper panel member wherein said plurality of second rib members are vertically spaced from each other so as to define a plurality of second spaces therebetween such that said plurality of first rib members and said plurality of first spaces of said first lower panel member interengage said plurality of second rib members and said plurality of second spaces of said second upper panel member in an interdigitated manner so as to achieve said removable mounting of said second upper panel member upon said first lower panel member, whereby when personnel require access to the refrigeration unit, only said second upper panel member needs to be removed in lieu of requiring the removal of the entire air return bulkhead comprising said first lower and second upper panel members.

2. The air return bulkhead as set forth in claim 1, wherein:
a lower edge portion of said second upper panel member is removably connected to an upper edge portion of said first lower panel member.

3. The air return bulkhead as set forth in claim 1, wherein:
said first lower and second upper panel members define hollow enclosure structures so as to define said return air conduit leading up to the air inlet portion of the refrigeration unit disposed within the refrigeration container.

4. The air return bulkhead as set forth in claim 3, further comprising:
return air inlets defined within a lower region of said first lower panel member so as to permit return air from the cargo area of the refrigeration container to enter said return air conduit leading up to the air inlet portion of the refrigeration unit disposed within the refrigeration container.

5. The air return bulkhead as set forth in claim 4, wherein said return air inlets comprise:
a first set of apertures defined within a bottom wall member of said first lower panel member; and
a second set of apertures defined within a region of said first lower panel member which is interposed between said bottom wall member of said first lower panel member and said upper edge portion of said first lower panel member.

6. The air return bulkhead as set forth in claim 5, wherein:
said first and second sets of apertures comprise a multiplicity of apertures arranged within grid-type patterns.

7. The air return bulkhead as set forth in claim 2, wherein:
said plurality of first rib members of said first lower panel member are disposed upon said upper edge portion of said first lower panel member while said plurality of second rib members of said second upper panel member are disposed upon said lower edge portion of said second upper panel member.

8. The air return bulkhead as set forth in claim 7, wherein:
a plurality of slots are defined within said lower edge portion of said second upper panel member; and
a plurality of upstanding tab members are disposed upon said upper edge portion of said first lower panel member and insertable through said plurality of slots defined within said lower edge portion of said second upper panel member so as maintain said first and second rib members of said first lower panel member and said second upper panel member interengaged with each other and thereby maintain said second upper panel member removably mounted upon said first lower panel member.

9. The air return bulkhead as set forth in claim 1, wherein:
said second upper panel member is adapted to be removably affixed to the wall member of the refrigeration container.

10. The air return bulkhead as set forth in claim 9, wherein:
peripheral edge portions are defined upon said second upper panel member; and
fasteners are adapted to be pivotally mounted upon the wall member of the refrigeration container such that when said fasteners are disposed at a first position, said fasteners will engage said peripheral edge portions of said second upper panel member so as to affix said second upper panel member to the wall member of the refrigeration container, and when said fasteners are disposed at a second position, said fasteners will be disengaged from said peripheral edge portions of said second upper panel member such that said second upper panel member is not affixed to the wall member of the refrigeration container.

11. In combination, an air return bulkhead to be used within a refrigeration container for conducting return air from the cargo area of the refrigeration container to an air inlet portion of a refrigeration unit disposed within the refrige-ration container, comprising:
a refrigeration unit having an air inlet portion;
a first lower panel member adapted to be fixedly mounted to a wall member of the refrigeration container such that a first surface portion of said first lower panel member is spaced from the wall member of the refrigeration container in order to partially define a return air conduit, between said first surface portion of said first lower panel and the wall member of the refrigeration container, for conducting return air toward said air inlet portion of said refrigeration unit disposed within the refrigeration container;
a second upper panel member removably disposed atop said first lower panel member such that a second surface portion of said second upper panel member is disposed in a substantially coplanar manner with respect to said first surface portion of said first lower panel member so as to effectively complete the definition of said return air conduit leading up to said air inlet portion of said refrigeration unit disposed within the refrigeration container;
said first lower panel member comprising a plurality of transversely oriented first rib members extending across said first lower panel member wherein said plurality of first rib members are vertically spaced with respect to each other so as to define a plurality of first spaces therebetween; and
said second upper panel member comprising a plurality of transversely oriented second rib members extending across said second upper panel member wherein said plurality of second rib members are vertically spaced from each other so as to define a plurality of second spaces therebetween such that said plurality of first rib members and said plurality of first spaces of said first lower panel member interengage said plurality of second rib members and said plurality of second spaces of said second upper panel member in an interdigitated manner so as to achieve said removable mounting of said second upper panel member upon said first lower panel member,
whereby when personnel require access to said refrigeration unit, only said second upper panel member needs to be removed in lieu of requiring the removal of the entire air return bulkhead comprising said first lower and second upper panel members.

12. The combination as set forth in claim 11, wherein:
a lower edge portion of said second upper panel member is removably connected to an upper edge portion of said first lower panel member.

13. The combination as set forth in claim 12, wherein:
said first lower and second upper panel members define hollow enclosure structures so as to define said return air conduit leading up to said air inlet portion of said refrigeration unit disposed within the refrigeration container.

14. The combination as set forth in claim 13, further comprising:
return air inlets defined within a lower region of said first lower panel member so as to permit return air from the cargo area of the refrigeration container to enter said return air conduit leading up to said air inlet portion of said refrigeration unit disposed within the refrigeration container.

15. The combination as set forth in claim 14, wherein said return air inlets comprise:
   a first set of apertures defined within a bottom wall member of said first lower panel member; and
   a second set of apertures defined within a region of said first lower panel member which is interposed between said bottom wall member of said first lower panel member and said upper edge portion of said first lower panel member.

16. The combination as set forth in claim 15, wherein:
   said first and second sets of apertures comprise a multiplicity of apertures arranged within grid-type patterns.

17. The combination as set forth in claim 12, wherein:
   said plurality of first rib members of said first lower panel member are disposed upon said upper edge portion of said first lower panel member while said plurality of second rib members of said second upper panel member are disposed upon said lower edge portion of said second upper panel member.

18. The combination as set forth in claim 17, wherein:
   a plurality of slots are defined within said lower edge portion of said second upper panel member; and
   a plurality of upstanding tab members are disposed upon said upper edge portion of said first lower panel member and insertable through said plurality of slots defined within said lower edge portion of said second upper panel member so as maintain said first and second rib members of said first lower panel member and said second upper panel member interengaged with each other and thereby maintain said second upper panel member removably mounted upon said first lower panel member.

19. The combination as set forth in claim 11, wherein:
said second upper panel member is adapted to be removably affixed to the wall member of the refrigeration container.

20. The combination as set forth in claim 19, wherein:
peripheral edge portions are defined upon said second upper panel member; and
fasteners are adapted to be pivotally mounted upon the wall member of the refrigeration container such that when said fasteners are disposed at a first position, said fasteners will engage said peripheral edge portions of said second upper panel member so as to affix said second upper panel member to the wall member of the refrigeration container, and when said fasteners are disposed at a second position, said fasteners will be disengaged from said peripheral edge portions of said second upper panel member such that said second upper panel member is not affixed to the wall member of the refrigeration container.

\* \* \* \* \*